US006813166B1

(12) United States Patent
Chang et al.

(10) Patent No.: US 6,813,166 B1
(45) Date of Patent: Nov. 2, 2004

(54) SYNCHRONOUS RECTIFYIER CONTROLLED BY A CURRENT TRANSFORMER

(75) Inventors: Shun-Te Chang, Taipei Hsien (TW); Ching-Feng Yang, Keelung (TW)

(73) Assignee: Acbel Polytech, Inc., Taipei Hsien (TW)

( * ) Notice: Subject to any disclaimer, the term of this patent is extended or adjusted under 35 U.S.C. 154(b) by 0 days.

(21) Appl. No.: 10/457,313

(22) Filed: Jun. 9, 2003

(51) Int. Cl.[7] .............................................. H02M 3/335
(52) U.S. Cl. ................. 363/21.14; 363/21.12
(58) Field of Search .......................... 363/21.14, 21.12, 363/21.15

(56) References Cited

U.S. PATENT DOCUMENTS 6,353,544 B1 * 3/2002 Lau ......................... 363/21.14

6,597,587 B1 * 7/2003 Poon et al. .............. 363/21.06

* cited by examiner

Primary Examiner—Shawn Riley
(74) Attorney, Agent, or Firm—Alan D. Kamrath; Nikolai & Mersereau, P.A.

(57) ABSTRACT

A power converter with synchronous rectifying through the control of a current transformer is disclosed. The basic architecture of the power converter includes a flyback transformer (10), a switch controller (20) and a current transformer (30). The secondary winding of the flyback transformer (10) is connected to the primary winding of the current transformer (30) used to control the switch controller (20). The primary winding of the current transformer (30) is connected to a synchronous rectifying switch (Q7). If a current change occurs on the secondary winding of the flyback transformer (10), the current transformer (30) detects the phase change and enables the switch controller (20) to switch off the synchronous rectifying switch (Q7). The current transformer (30) turns off the synchronous rectifying switch (Q7) anticipatorily in the continuous current output mode to prevent any power loss from crossovers.

6 Claims, 8 Drawing Sheets

SYNCHRONOUS RECTIFYIER CONTROLLED BY A CURRENT TRANSFORMER

BACKGROUND OF THE INVENTION

1. Field of the Invention

The present invention relates to a synchronous rectifier controlled by a current transformer (CT), in particular to a synchronous rectifier with the secondary winding connected by a current transformer in series to switch off the synchronous rectifier switch located on the secondary winding to prevent power loss from crossovers.

2. Description of Related Arts

Nowadays, electronic equipment with high efficiency and low power consumption is in high demand, as consumers begin to pay more attention to the stableness of the power supply and the power consumption. With the advances in the semiconductor manufacturing technology, MOSFET devices are more extensively used to build synchronous rectifying driver ICs. Many types of synchronous rectifying driving ICs are currently available, but their high prices and the complicated control circuits have resulted in the low market acceptance.

A conventional power converter with synchronous rectifying is shown in FIG. 8. according to the structure of the power converter, the secondary winding of the transformer (51) has a comparator (52), and the output of the comparator (52) is used to control the switching of the synchronous rectifying device (53), and the secondary winding of the transformer (51) is also coupled with an induction coil (54), which is connected through a switch (55) to the comparator (52).

In the control circuitry of the above-mentioned power converter, an induction coil (54) is employed to detect any current change through the transformer(51), and then the switching of the synchronous rectifying device (53) is effected directly through the comparator (52) based on the induction signals received. However, the disadvantage of the above circuitry is that the synchronous rectifying device (53) fails to give an early response to the current change in the continuous current output mode; hence, it is subject to the danger of power loss from crossovers.

SUMMARY OF THE INVENTION

The main object of the present invention is to provide a synchronous rectifier through the control of a current transformer to prevent power loss from crossovers when operating in the continuous current output mode.

To this end, the architecture of the synchronous rectifier in accordance with the present invention includes a flyback transformer, a switch controller, a current transformer and a driving circuit.

The flyback transformer has a primary winding and a secondary winding. The primary winding is connected to a switching transistor, and the secondary winding is connected to the primary winding of a current transformer.

The switch controller is used to control the switching of a synchronous rectifier switch base on the induction signals received from the secondary winding of the current transformer. One end of the synchronous rectifier switch is connected to the primary winding of the current transformer, and the other end is connected to ground.

If current appears on the secondary winding of the flyback transformer, the secondary winding of the current transformer detects a positive voltage pulse, and the switch controller is enabled to switch on the synchronous rectifier switch. Conversely, if no current is present on the secondary winding of the flyback transformer, the synchronous rectifying switch is turned off.

Furthermore, the current transformer has an auxiliary coil on the primary winding connected to the switching transistor in the switch controller. When the primary winding operating in the continuous current mode detects the cut-off signal, it enables the switching transistor to switch off the synchronous rectifying switch anticipatorily.

The features and structure of the present invention will be more clearly understood when taken in conjunction with the accompanying drawings.

DETAILED DESCRIPTION OF THE PREFERRED EMBODIMENT

Figure 1:
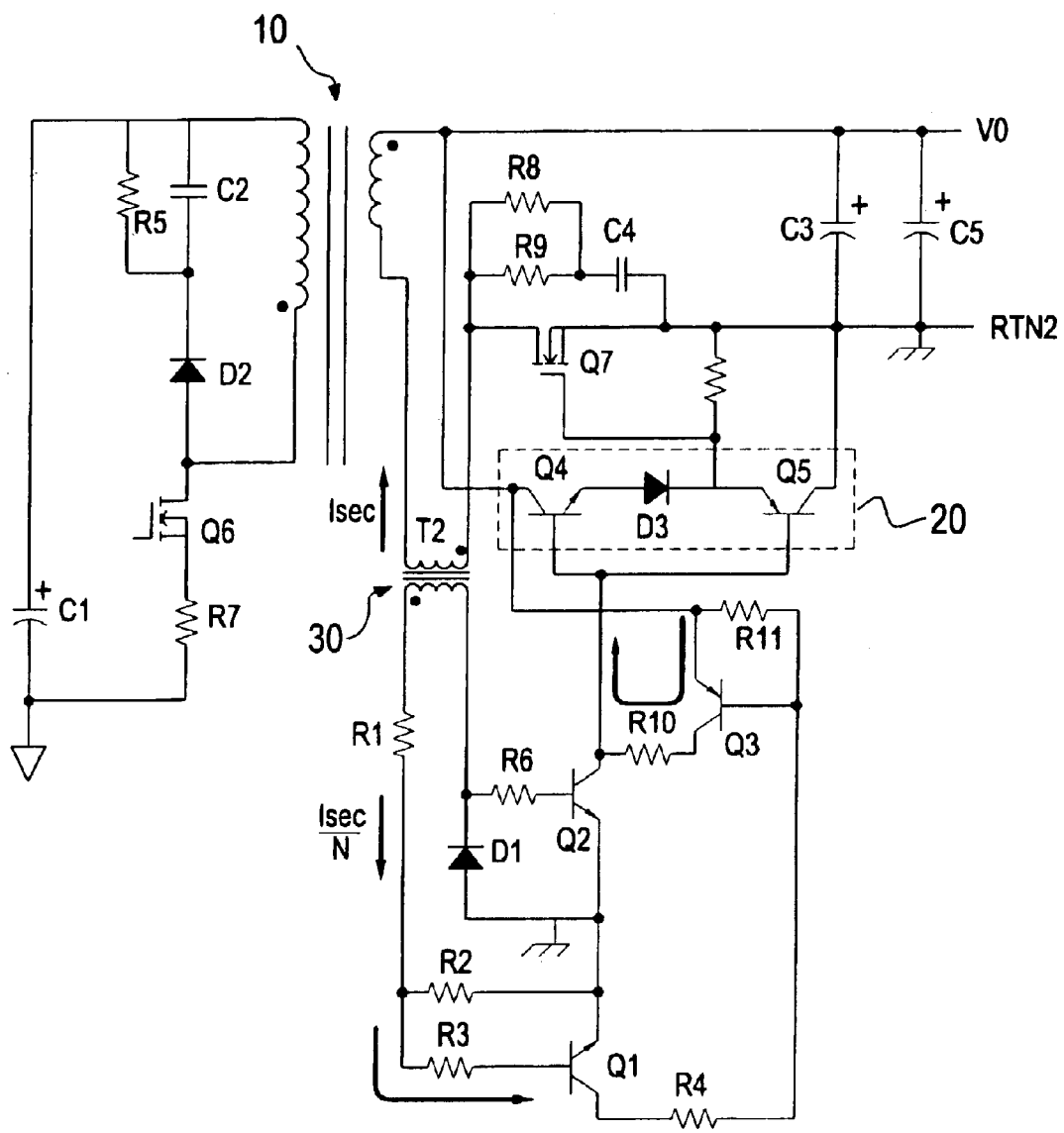
FIG. 1 is a schematic diagram of the present invention.

The basic architecture of a synchronous rectifier controlled by a current transformer, as shown in FIG. 1, includes a flyback transformer (10), a switch controller (20), a current transformer (30).

The flyback transformer (10) has a primary winding and a secondary winding. The primary winding of the flyback transformer (10) is connected to a switching transistor (Q6), and the secondary winding is connected to the primary winding of a switch controller (20) used to control a synchronous rectifying switch (Q7) (in the present embodiment the synchronous rectifying switch is implemented by a MOSFET).

The switch controller (20) is used to control the switching of a synchronous rectifying switch (Q7) based on the induction signals received from the secondary winding of the current transformer. One of the two ends of the synchronous rectifying switch (Q7) is connected to the primary winding of the current transformer, and the other end is connected to ground.

The switch controller (20) is formed by an NPN transistor (Q4) and a PNP transistor (Q5), wherein the bases of these two transistors (Q4) (Q5) are interconnected, and a diode (D3) is connected in series in between the emitters of the two transistors (Q4) (Q5). It should be noted that the NPN transistor (Q4) is able to be replaced with an NMOS transistor, and the PNP transistor (Q5) could be replaced with an PMOS transistor.

The current transformer (30) has a primary winding and a secondary winding. The two ends on the primary winding are respectively connected to the secondary winding of the flyback transformer (10) and the synchronous rectifying switch (Q7). The two ends on the secondary winding are respectively connected to the base of two transistors (Q1) (Q2), where the emitters of these two transistors (Q1) (Q2) are interconnected.

The collector of the first transistor (Q1) is connected to the base of a third transistor (Q3), and the collector of the second transistor (Q2) is connected to the collector of the third transistor (Q3). The emitter of the third transistor (Q3) is connected to the collector of NPN transistor (Q4) in the switch controller (20).

Figure 2:
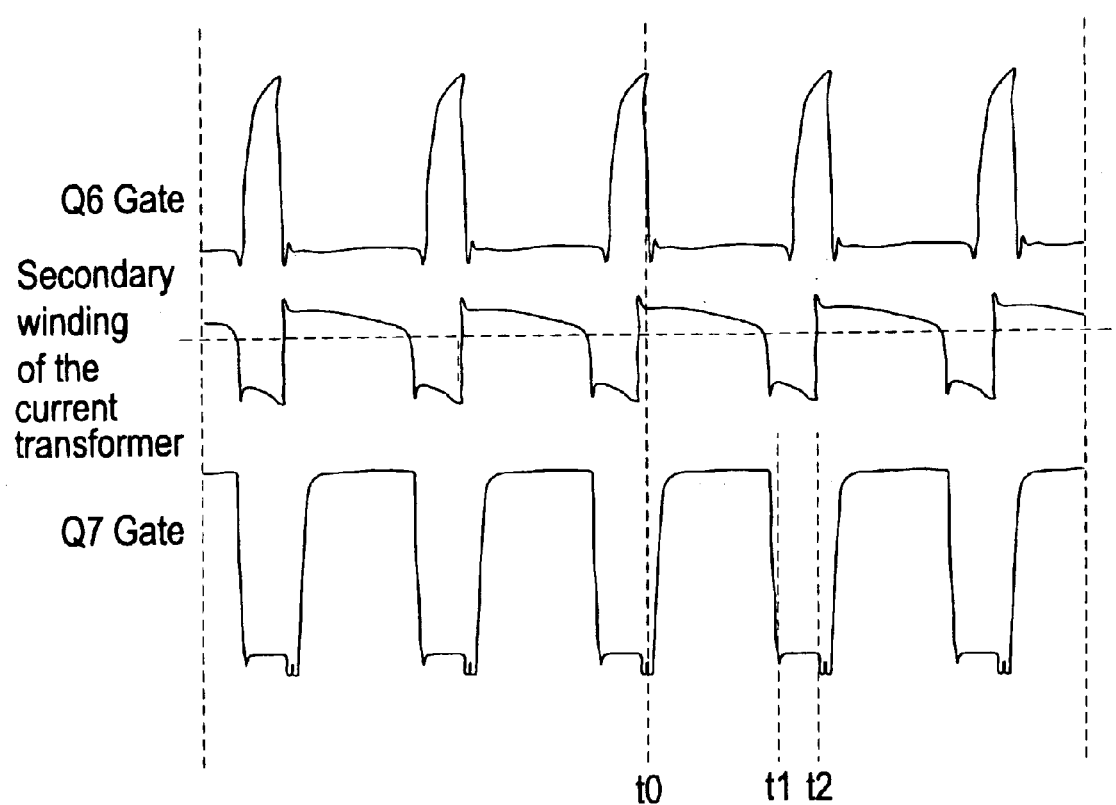
FIG. 2 is a timing chart of the required driving signal in accordance with the present invention.

The foregoing explained the detailed architecture of the present invention, and the circuit actions are to be illustrated in conjunction with FIG. 2.

FIG. 2 shows the signal waveform from the gate of the switching transistor (Q6) connected to the flyback transformer (10); and the signal waveform of the output voltage from the secondary winding of the current transformer (30); and the signal waveform from the gate of synchronous rectifying switch (Q7).

The circuit action can be classified according to the current output modes from the secondary winding of the flyback transformer (10). The current output can be either continuous current or discontinuous current.

In the discontinuous current output mode, the circuit actions can be subdivided into several stages by different periods: first period (T0$^-$ to T0$^+$), second period (T0$^+$ to T1$^-$), the third period (T1$^-$ to T1$^+$) and the fourth period (T1–T2), where the plus sign on T0$^+$ denotes the time passing the point T0 by a predetermined interval; the minus sign on T0$^-$ denotes that the time preceding the point T0 by a predetermined interval. These notations will be referenced in all subsequent paragraphs.

The first period (T0$^-$–T0$^+$):

If current (Isec) appears over the secondary winding of the flyback transformer(10), the current (Isec) also passes through the primary winding of the current transformer (30), so that the secondary winding of the current transformer (30) will detect the output voltage, which can be expressed by the following formula:

$$V = I_{sec} \times \frac{1}{N} \times R1 + Q1_{Vbe} + R3 \times Ia + V_{D1}$$

where N represents the number of turns on the primary and secondary windings.

When the base of the first transistor (Q1) receives a driving current (Ia), it is turned on. When the first transistor (Q1) is turned on, the third transistor (Q3) is also simultaneously turned on, forcing the NPN transistor (Q4) in the switch controller (20) to be turned on and the PNP transistor (Q5) to be turned off. The gate of the synchronous rectifying switch (Q7) receives a high voltage pulse and becomes turned on. At this point, the energy stored in the gap of the flyback transformer (10) is transferred to the secondary winding for providing the necessary power to the load at the end of the line (not shown).

The second period (T0$^+$ to T1$^-$):

In the period (T0$^+$ to T1$^-$), the synchronous rectifying switch (Q7) is always maintained at high potential, wherein the current flowing through the flyback transformer (10) is in decrement.

Figure 3:
FIG. 3 is a timing chart of the driving signal in the case of a small output current (Isec)

As shown in FIG. 3, if the output is in a floating state, the output current (Isec) nears zero, the resistance ratio between the two resistors (R2) (R3) in the first transistor (Q1) can be adjusted to cause no current output from the first transistor (Q1), such that the synchronous rectifying switch (Q7) will be cut off to reduce power consumption.

The third period (T1$^-$–T1$^+$):

As shown in FIG. 2, if the output current (Isec) is zero, the first transistor (Q1) is to be switched off. According to the Faraday's Law of induction, the moment that the first transistor (Q1) is switched off, the magnetic flux remains unchanged, and the negative voltage from the secondary winding of the current transformer (30) will turn on the second transistor (Q2). If a low voltage appears over the base of the PNP transistor (Q5) in the switch controller (20), the synchronous rectifying switch (Q7) is switched off.

Figure 4:
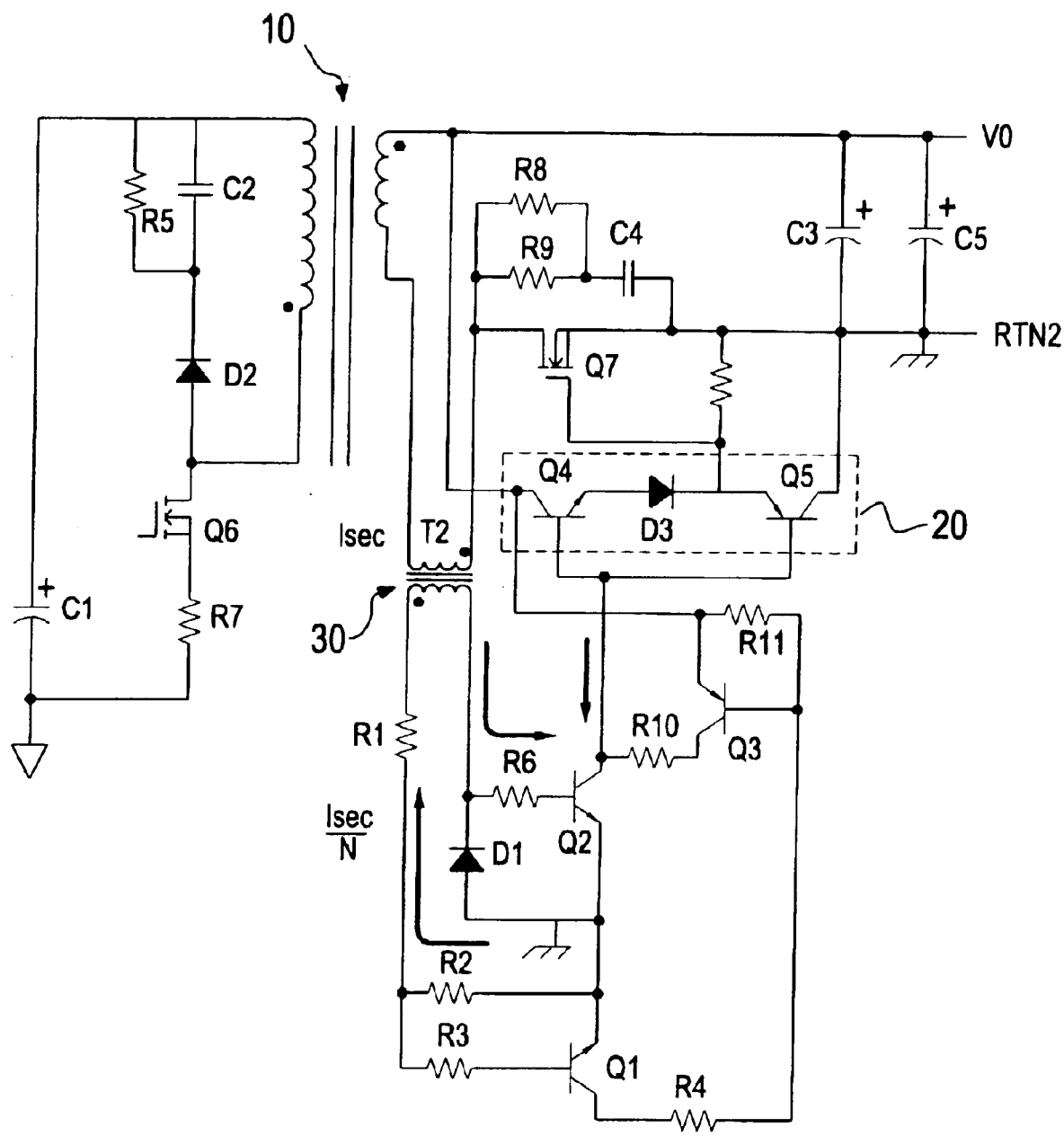
FIG. 4 is a schematic diagram showing the flyback transformer operated in a discontinuous current mode.

The fourth period (T1 to T2):

As shown in FIGS. 2 and 4, as the output current (Isec) is maintained at zero, the PNP transistor (Q5) in the switch controller (20) and the second transistor (Q2) are turned on, and at this point, the gate of the synchronous rectifying switch (Q7) is still at low potential.

Figure 5:
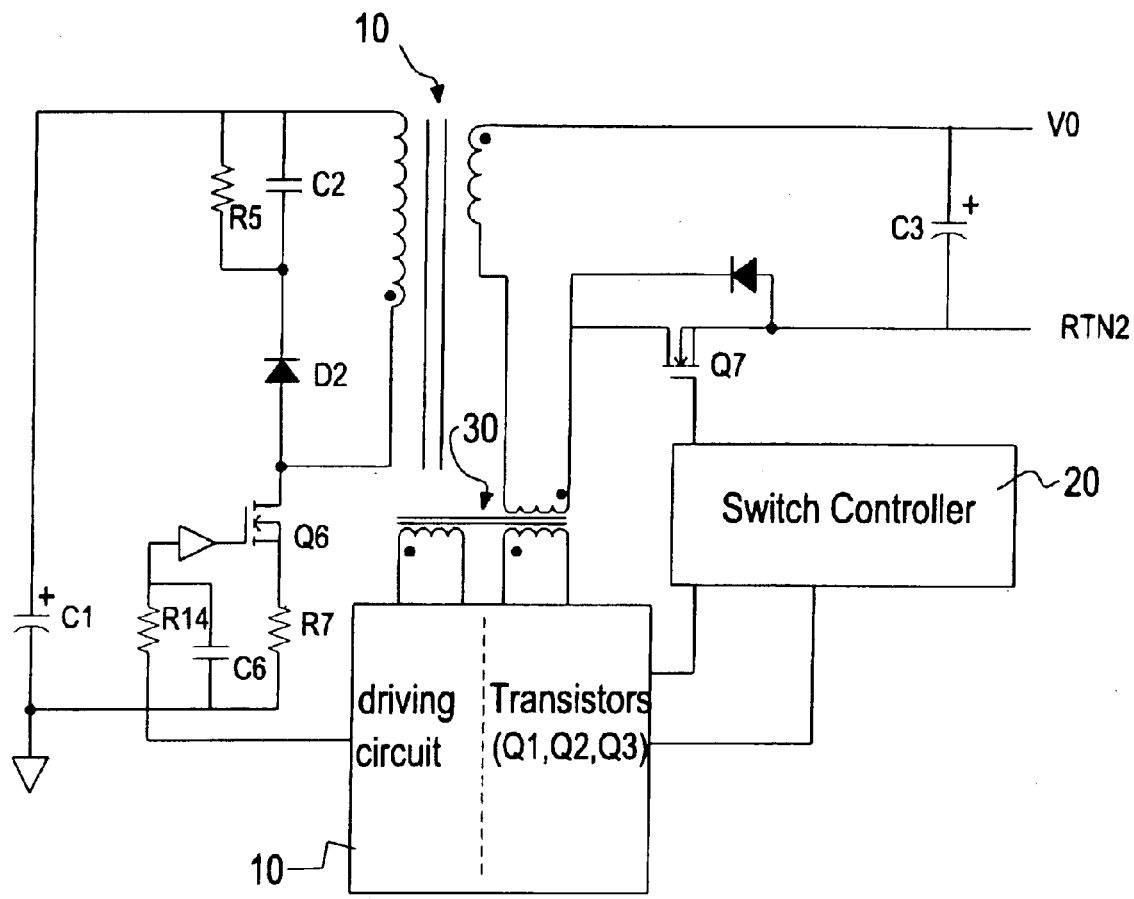
FIG. 5 is a block diagram showing the circuit action in the continuous current output mode.

As shown in FIG. 5, in the continuous current output mode, the structure of the circuitry is similar to that in the discontinuous current output mode, except that an auxiliary coil is provided in the primary winding of the current transformer (30), which is connected to a driving circuit (40) of the switching transistor (Q6).

Figure 6:
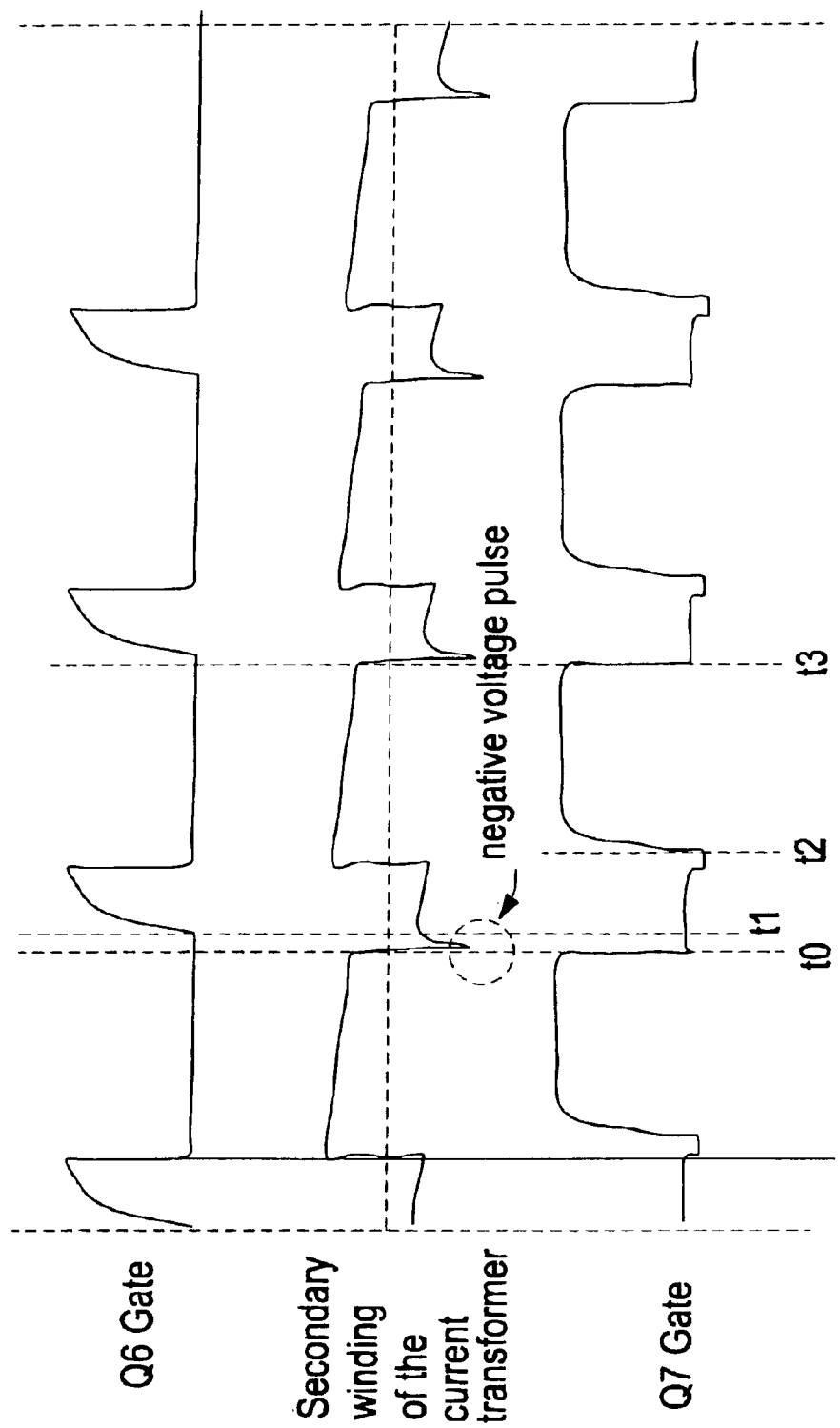
FIG. 6 is a timing chart of the driving signal in the continuous current output mode.
Figure 7:
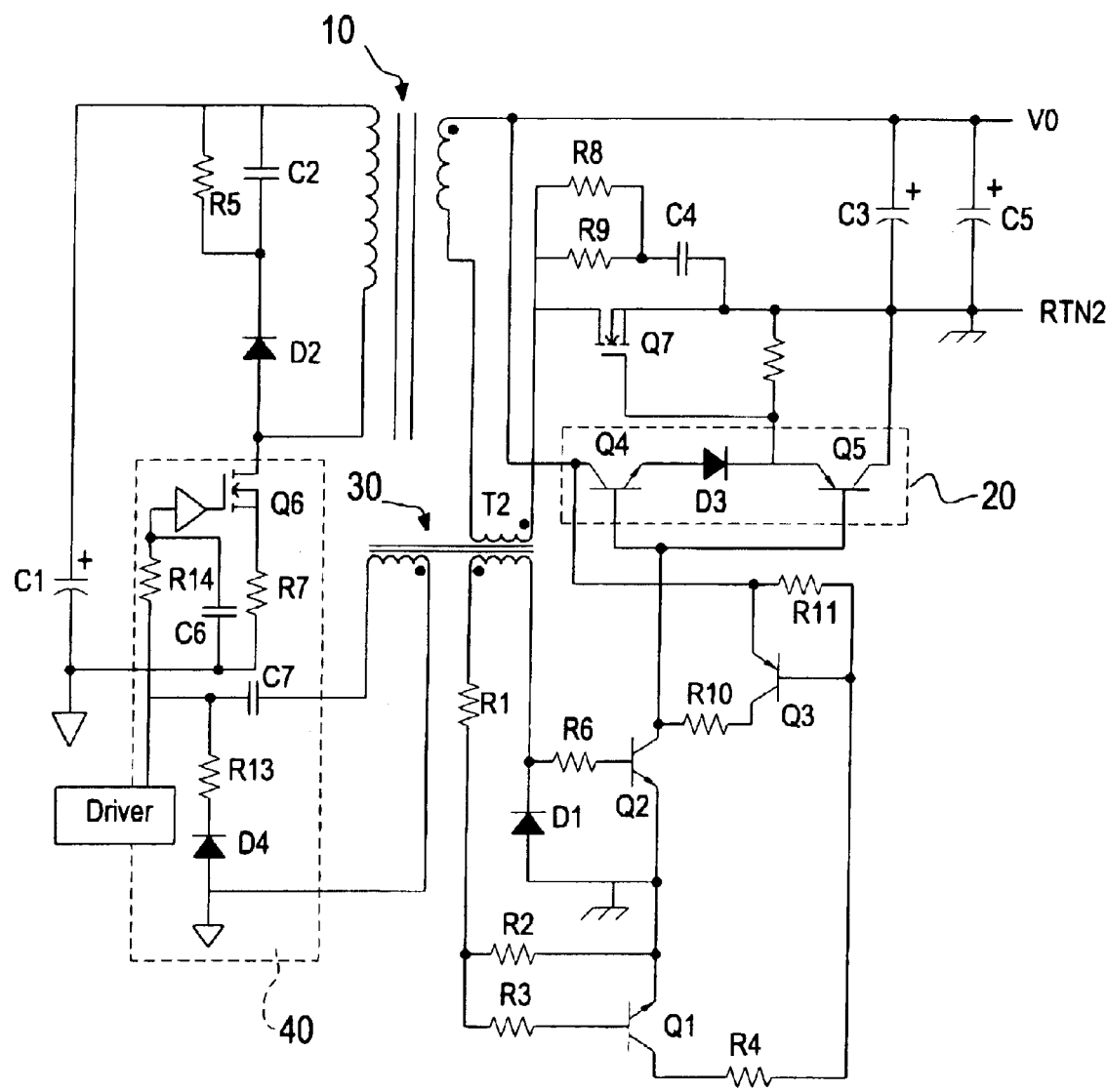
FIG. 7 is a diagram showing the circuit action of the invention in the continuous current output mode.
Figure 8:
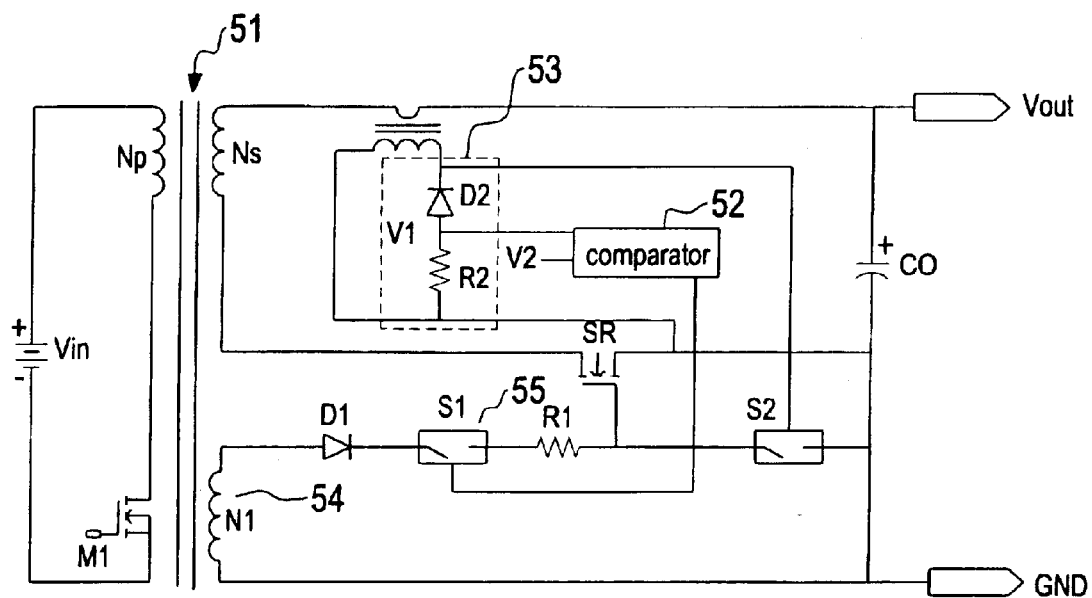
FIG. 8 is a schematic diagram showing the circuit action of a conventional power converter with synchronous rectifying.

As shown in FIGS. 6 and 7, the gate of the switching transistor (Q6) is connected by a driving circuit (40), which has a resistor R14, two capacitors C6 and C7.

In the period (T0 to T1), the driving signal from the gate of switching transistor (Q6) is changed from low to high potential. Since the signal passes through the resistor R14 and the capacitor C6, there is a delay. The gate of the switching transistor (Q6) is therefore switched to high potential at time T1.

However, at time T0, the positive voltage of the driving signal passes through the capacitor (C7) coupled to the primary winding of the current transformer (30), and at the same time the secondary winding on the current transformer (30) detects a negative voltage pulse, as shown in the diagram, and this negative voltage pulse will cause the synchronous rectifying switch (Q7) to be turned off.

Under such circumstances, the cut-off action of the synchronous rectifying switch (Q7) can be moved up in advance of time T1, to prevent power loss from crossovers between the primary winding of the flyback transformer (10) and the secondary winding of the current transformer (30).

In the period (T1 to T2), in the presence of the negative pulse, the first transistor (Q1) is switched off. Conversely, the base of the second transistor (Q2) receiving a high voltage pulse becomes turned on, forcing the PNP transistor (Q5) to be turned on and the synchronous rectifying switch (Q7) to remain off in the period.

In the time period (T2 to T3), when the output current (Isec) is resumed, current passes through the primary winding of the current transformer (30), producing an inductance in the secondary winding, with the induced voltage represented by the formula $$V = I_{sec} \times \frac{1}{N} \times R1 + Q1_{Vbe} + R3 \times Ia + V_{D1}.$$

The induced voltage causes the first and third transistors (Q1) (Q3) and the NPN transistor (Q4) in the switch controller (20) to be turned on, causing the synchronous rectifying switch (Q7) to be switched on again, and the energy stored in the gap of the flyback transformer (10) is transferred to the secondary winding, and the current flow through the secondary winding is in decrement.

In sum, in the present invention, when operating in the discontinuous current output mode, any current change on the secondary winding of the flyback transformer is detected by the current transformer for cutting off the synchronous rectifying switch (Q7). In addition, if the output current is in a small amount, the synchronous rectifying switch (Q7) will also be cut off. On the other hand, when operating in the continuous current output mode, the synchronous rectifying switch (Q7) can be turned off in advance of any current change to avoid power loss from crossovers.

The foregoing description of the preferred embodiments of the present invention is intended to be illustrative only and, under no circumstances, should the scope of the present invention be so restricted.

What is claimed is:

1. A synchronous rectifier controlled by a current transformer, the synchronous rectifier comprising a flyback transformer (10), a switch controller (20), a current transformer (30), wherein the flyback transformer (10) has a primary winding and a secondary winding, wherein the primary winding on the flyback transformer (10) is connected to a switching transistor, and the secondary winding is connected to a primary winding of the current transformer (30);

the switch controller (20) basing on induction signals received from a secondary winding of the current transformer (30) turns off a synchronous rectifying switch (Q7), where one of the two ends of the synchronous rectifying switch (Q7) is connected to primary winding of the current transformer (30), and the other end is connected to ground;

the current transformer (30) has a primary winding and a secondary winding, wherein the current transformer (30) is series connected to the secondary winding of the flyback transformer (10);

such that if a current is present over the secondary winding of the flyback transformer (10), a positive voltage pulse will be detected by the secondary winding of the current transformer (30) enabling the switch controller (20) to switch on the synchronous rectifying switch (Q7); conversely, if no current is present, the synchronous rectifying switch (Q7) is turned off.

2. The synchronous rectifier as claimed in claim 1, wherein the current transformer (30) has an auxiliary coil coupled to primary winding for connection to a switching transistor of the switch controller (20), whereby when a cut-off signal is detected over the primary winding in the continuous current output mode, the switching transistor is enabled to cause the synchronous rectifying switch (Q7) to be turned off anticipatorily.

3. The synchronous rectifier as claimed in claim 1, wherein the switch controller (20) is formed by an NPN transistor and a PNP transistor, wherein bases of these two transistors are interconnected, and a diode is installed in between emitters of these two transistors, and the emitter of the PNP transistor is connected to the synchronous rectifying switch (Q7).

4. The synchronous rectifier as claimed in claim 2, wherein the switch controller (20) is formed by an NPN transistor and a PNP transistor, wherein bases of these two transistors are interconnected, and a diode is installed in between emitters of these two transistors, and the emitter of the PNP transistor is connected to the synchronous rectifying switch (Q7).

5. The synchronous rectifier as claimed in claim 3, wherein two ends on the secondary winding of the current transformer (30) are respectively connected to the base of the first transistor and the base of the second transistor, and emitters of these two transistors are interconnected, wherein the collector of the first transistor is connected to base of a third transistor, and the collector of the second transistor is connected to collector of the third transistor, and emitter of the third transistor is connected to collector of the NPN transistor in the switch controller (20).

6. The synchronous rectifier as claimed in claim 4, wherein the secondary winding of the current transformer (30) is respectively connected to the base of the first transistor and the second transistor, and the emitters of these two transistors are interconnected, wherein the collector of the first transistor is connected to base of a third transistor, and the collector of the second transistor is connected to the collector of the third transistor, and emitter of the third transistor is connected to collector of the NPN transistor in the switch controller (20).

* * * * *